UNITED STATES PATENT OFFICE.

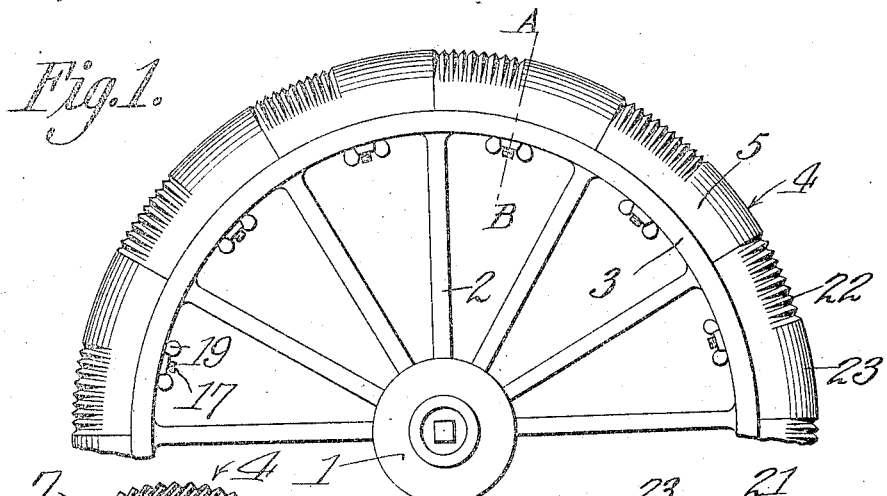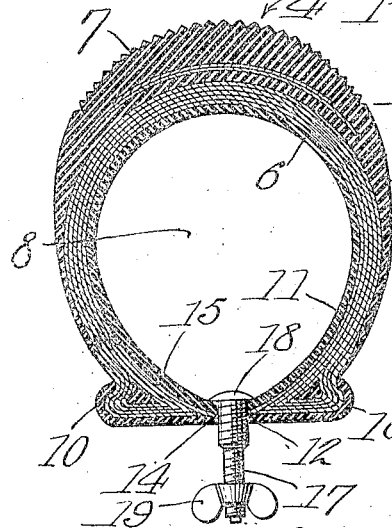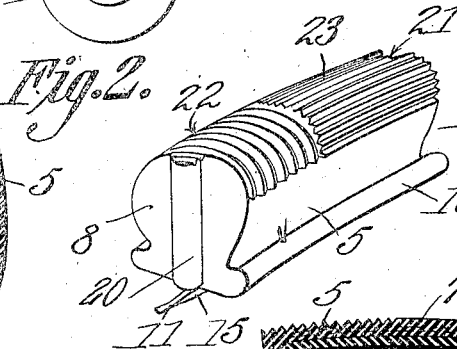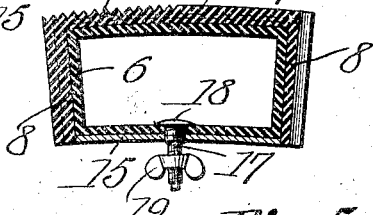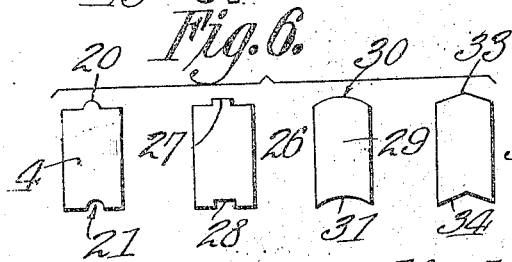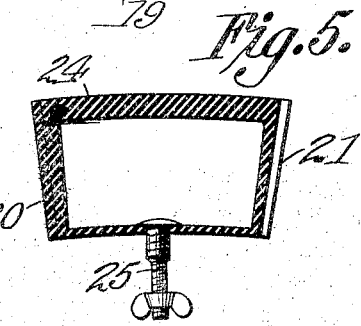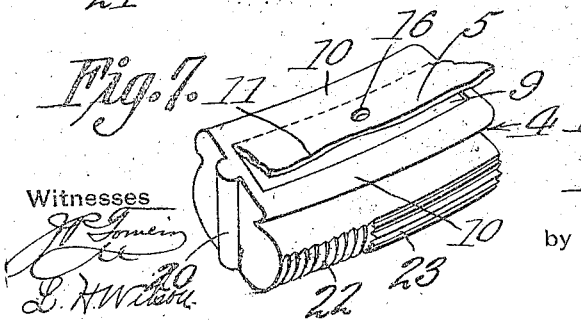

FREDERICK KELLER AND HENRY COGAN, OF PATERSON, NEW JERSEY.

TIRE.

1,104,426.

Specification of Letters Patent. Patented July 21, 1914.

Application filed April 2, 1912. Serial No. 688,066.

*To all whom it may concern:*

Be it known that we, FREDERICK KELLER and HENRY COGAN, citizens of the United States, residing at Paterson, in the county of Passaic, State of New Jersey, have invented a new and useful Tire, of which the following is a specification.

One object of the present invention is to provide a vehicle tire fashioned in a series of independently removable, and independently inflatable sections, the construction being such that any one section, when injured, may be removed, without completely deflating the tire, and without jacking up the wheel.

A further object of the invention is to provide novel means for assembling each section with the rim of the wheel.

The invention aims further to provide a tire consisting of a series of sections, each section having at its end an element, adapted at once to interlock with another section, and to constitute a means for reinforcing the tire radially.

A further object of the invention is to provide novel means whereby each section may be interlocked with an adjoining section.

The invention aims further to provide a novel form of closure flap for the outer casing, whereby the outer casing may be made to inclose the inner tube.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a portion of a wheel to which has been applied a tire constructed in accordance with the present invention; Fig. 2 is a section on the line A—B of Fig. 1; Fig. 3 is a perspective of one of the tire sections; Fig. 4 is a longitudinal section of the structure shown in Fig. 3; Fig. 5 is a longitudinal section showing a modified form of the invention; Fig. 6 illustrates in top plan, the preferred form of the invention and sundry modifications thereof; and Fig. 7 is an inverted perspective of the structure shown in Fig. 3.

In the drawings, the numeral 1 indicates the hub of a wheel from which radiate the spokes 2 carrying a rim 3. Surrounding the rim 3 is the tire, consisting of a plurality of individually removable and individually inflatable sections 4.

Each section 4 comprises an outer casing 5 and an inner tube 6. The outer casing 5 consists of a side wall 7 and end walls 8. In the under face of each section 4 there is an opening 9. The opening 9 does not extend through the end walls 8. Each section may be provided with clencher flanges 10 of any desired form. Secured to the inner face of the outer casing 5 is a reinforcing member 11, preferably a sheet of canvas. The reinforcing member 11 extends from one edge 12 of the opening 9 past the other edge 14 of the opening, thereby to define a yieldable tongue 15 adapted to extend across the opening 9 and to overlap the initial end of the reinforcing member 11. There is an opening 16 in the tongue 15 through which the valve stem 17 extends, the valve stem 17 lying between the edges 12 and 14 of the opening 9 in the outer casing 5. The valve stem 17 is equipped at one end with a head 18 bearing directly against the interior of the inner tube 6. The valve stem 17 extends through the rim 3, and a wing nut 19 or like device, applied to the stem 17, engages the rim 3 and serves to hold each section of the tire upon the rim. The valve stem includes a neck 17ª upon which is a heavy thread to receive the wing nut 19. Projecting from the neck 17ª is a reduced, threaded lip 17ᵇ which receives the usual cap.

One of the end walls 8 of the section 4 is equipped with an outstanding rib 20 extended entirely across the end wall. This rib 20 is adapted to register in a groove 21 formed in the next adjoining section, all of the sections being duplicates. Each section 4 is equipped upon its outer face, and adjacent one end, with transversely extended ribs 22. Adjacent its opposite end, each section is equipped with longitudinally extended ribs 23, the ribs 23 and the ribs 22 covering the entire tread face of each section 4. Notwithstanding the fact that the tongue and the groove construction 20—21 is one of the simplest, and in many respects, the most satisfactory means of operatively connecting a plurality of tire sections of the sort herein described, the method in question has met with but limited practical use, owing to the fact that the formation of the groove indicated at 21 so weakens one end of the section that the same yields under circumferential pressure. As a consequence, there is continued friction and wear between the groove 21 and the tongue 20, and these parts not only open and admit foreign matter but, at times, become disengaged from each other. In the present instance, the weaker end of the tire section, to wit, the end which is provided with the groove 21 is reinforced by the longitudinally extended ribs 23. That end of the section which is reinforced by the tongue 20, does not require the reinforcement afforded by the ribs 23 and, indeed, it is desirable that this end of the section should yield to a slight extent in order that the tongue 20 may be engaged properly with the groove 21. With this end in view, the transverse ribs 22 are provided, adjacent the tongue 20. Now although the longitudinal ribs 23 serve to reinforce one end of the section, adjacent the groove 21, they have no tendency to prevent relative movement, circumferentially of the wheel, between the section and the ground, and as a consequence, there would be a tendency for the outer end of the tongue 20 to be torn off the end wall of the section, were it not for the presence of the transverse ribs 22. These transverse ribs 22 being interposed in front of the rib 20 serve to receive the shock due to the contact between the wheel and the ground, as the wheel rotates, and thus, a loosening of the rib 20 is prevented.

The device hereinbefore described is to be used with an inner tube. The invention may be applied to a single tube tire, indicated at 24 in Fig. 5. In this form of the invention the tube 24 is devoid of the opening 9. The tire 24, however, is equipped at one end with the rib 20, and is grooved at its other end to receive the corresponding rib 20 of an adjoining section, as hereinbefore pointed out. The valve is indicated at 25, and is of the construction hereinbefore set forth.

In Fig. 6 the preferred form of the invention is shown together with sundry modifications. If desired, as shown in Fig. 6 each section 26 may be equipped at one end with a rectangular rib 27 and with a correspondingly shaped groove 28 in its opposite end, the rib 20 and the groove 21 in the preferred form of the invention being preferably of semi-circular cross section. Each section 29 may be convexed throughout its entire cross section, as indicated at 30 to fashion the rib, the section being concaved throughout its entire cross section as indicated at 31, to form the groove. The section 32 may be brought to a point at one end, as indicated at 33, to fashion the rib, the groove 34 being V-shaped to correspond with the rib 33.

In order to provide against accidents arising from a puncture of the tire, it is not necessary, in the present invention, to carry upon the car, a complete tire. One or more of the sections, in deflated condition, are carried within a suitable receptacle thereby economizing space and dispensing with the additional weight incident to the carrying of a completed tire, or completed wheel, as is sometimes done.

When any one section upon the wheel becomes deflated, the car may be rolled ahead a few feet until the deflated section is free from the ground, thereby obviating the use of a jack. The wing nut 19 may be removed from the valve stem 17, permitting the deflated section to be lifted off the rim 3, another section being readily mounted in place, the wing nut 19 being applied to the valve stem 17, to engage the rim 3, and to hold the section upon the rim.

In placing the inner tube 6 within the casing 5, the inner tube, being deflated, is thrust through the opening 9. The free edge of the tongue 15 is then tucked into the opening, to overlap the side wall 7 of the section 4. The section may then be placed upon the rim, in the manner hereinbefore described.

The interlocking elements represented by the rib 20 and the groove 21 serve not only to prevent the sections from having independent relative movement, transversely of the rim, but, as well, each rib 20 serves as a reinforcing element at the end of each section, tending to prevent an undue flattening of the sections. The reinforcing strip 11 serves to protect the inner tube 6, and the tongue 15, formed by the free edge of the reinforcing strip serves to prevent the inner tube 6 from coming into contact with the rim 3. Owing to the fact that certain of the ribs 22 extend transversely of each section 4, and owing to the further fact that other of the ribs 23 extend longitudinally of each section, the wheel will be prevented from slipping either transversely or longitudinally.

Having thus described the invention, what is claimed is:

A tire comprising a plurality of individually removable sections, each section having a groove in one end wall and being provided upon its other end wall with a tongue adapted to register in the groove of an adjoining section; each section being provided in its tread with longitudinal ribs located adjacent the groove and adapted to stiffen the section longitudinally adjacent the groove, each section being provided in its tread with transverse ribs located adjacent the tongue, the transverse disposition of the last specified ribs permitting the section to yield longitudinally whereby the groove of one section may be engaged by the tongue of an adjoining section.

In testimony that we claim the foregoing as our own, we have hereto affixed our signatures in the presence of two witnesses.

FREDERICK KELLER.
HENRY COGAN.

Witnesses:
CLARENCE J. CODDINGTON,
FREDRICK F. WRABACH.